(12) United States Patent
Brooks et al.

(10) Patent No.: US 6,523,604 B1
(45) Date of Patent: Feb. 25, 2003

(54) INDIRECT EVAPORATIVE COOLING APPARATUS

(76) Inventors: Barry R. Brooks, P.O. Box 1771, Boise, ID (US) 83701-1771; Dan L. Field, 9855 Village Center Dr., Granite Bay, CA (US) 95746

( * ) Notice: Subject to any disclaimer, the term of this patent is extended or adjusted under 35 U.S.C. 154(b) by 0 days.

(21) Appl. No.: 09/434,858

(22) Filed: Nov. 4, 1999

Related U.S. Application Data

(60) Provisional application No. 60/107,374, filed on Nov. 6, 1998.

(51) Int. Cl.$^7$ ................................................. F28B 1/00
(52) U.S. Cl. ..................... 165/110; 165/115; 261/103; 261/111; 261/112.2; 261/117; 261/118; 261/153; 261/155
(58) Field of Search ................................ 165/110, 115; 261/155, 103, 111, 118, 117, 153, 112.2

(56) References Cited

U.S. PATENT DOCUMENTS

| | | | | |
|---|---|---|---|---|
| 4,002,040 A | * | 1/1977 | Munters et al. | .......... 261/153 X |
| 4,099,928 A | * | 7/1978 | Norback | .............. 261/112.2 X |
| 4,461,344 A | | 7/1984 | Allen et al. | |
| 4,461,733 A | | 7/1984 | Otterbein | |
| 4,512,392 A | | 4/1985 | van Ee et al. | |
| 4,566,290 A | | 1/1986 | Otterbein | |
| 4,708,832 A | * | 11/1987 | Norback | ..................... 261/153 |
| 4,846,266 A | * | 7/1989 | Acker et al. | ................. 165/115 |
| 5,187,946 A | | 2/1993 | Rotenberg et al. | |
| 5,664,433 A | | 9/1997 | Bourne et al. | |

FOREIGN PATENT DOCUMENTS

| | | | | |
|---|---|---|---|---|
| DE | 1253294 | * | 11/1967 | .................. 261/103 |
| GB | 493446 | * | 10/1938 | .................. 261/118 |
| GB | 878201 | * | 9/1961 | .................. 261/117 |
| JP | 54-117804 | * | 9/1979 | .................. 261/118 |

* cited by examiner

*Primary Examiner*—Leonard Leo
(74) *Attorney, Agent, or Firm*—Pedersen & Co. PLLC; Ken J. Pedersen; Barbara S. Pedersen

(57) ABSTRACT

The present invention is an indirect evaporative cooling module preferably made from extruded, twin-walled, corrugated, fluted plastic sheeting. Sheets of this corrugated material are cut into plates which are preferably laminated together to form the primary and secondary passages that comprise the heat exchanger core. These passages can be configured any number of ways, from vertical to horizontal to diagonal, and flow through these passages can be cross-flow, counter-flow and even baffle-flow. Increased heat exchange efficiency is achieved through a variety of ways, for example, by including an efficient water distribution means at the top of the heat exchanger, evaporative mesh extending through and below the heat exchanger for water distribution and pre-cooling, the creation of top and bottom heat exchange chambers by channeling water directly to the bottom zone of the heat exchanges passages, and roughening the surface of the sheets to increase heat transfer and to increase surface area. Optionally, turning vanes or convergers at the inlets of the heat exchanger may be added to improve fluid flow control.

27 Claims, 5 Drawing Sheets

INDIRECT EVAPORATIVE COOLING APPARATUS

This patent application claims priority from our prior, co-pending provisional patent application, Ser. No. 60/107,374, filed Nov. 6, 1998, entitled "Indirect Evaporative Cooling Apparatus for the Cooling of Air," which is incorporated herein by reference.

BACKGROUND OF THE INVENTION

1. Field of the Invention

The present invention relates to apparatus used for the cooling of air. More specifically, the present invention relates to apparatus for cooling air through indirect evaporative cooling and heat exchange.

2. Related Art

1. Evaporative Cooling

One method of cooling air is referred to as evaporative cooling. Evaporative cooling is the process of cooling dry air with water. As the air and water are brought into contact with one another, heat from within the air is transferred to the water as the water vaporizes into a gaseous mixture with the air. Usually, as in an evaporative cooler, this is achieved by pulling dry, warm air through a wet fiber mat, thereby creating moist, cool air. There are two major drawbacks to this form of cooling—first, the air is only cooled to a temperature well above dew point (saturation) temperature due to a short residence time, and second, evaporative cooling increases the humidity of the cooled air. This increased humidity results in discomfort, which can also create health and equipment problems within the space to be cooled.

2. Indirect Evaporative Cooling

A related and newer method of cooling air is referred to as "indirect evaporative cooling." Indirect evaporative cooling is the process of indirectly cooling ambient dry outdoor air, prior to its entering a space to be "air-conditioned" or "conditioned," with saturated, cool air that is outdoor air that has passed though an evaporative cooler with a long residence time. This is typically done by passing the two bodies of air through air passages adjacent to one another. This process results in heat transfer from the warmer, dry air body, into the cooler, saturated air body, thereby resulting in the cooling of the dry air body without increasing its moisture content. The apparatus housing such adjacent air passages is often referred to as an "indirect heat exchanger" or "indirect cooling module."

The major drawback to the use of indirect evaporative cooling has been cost. Currently, manufactured indirect cooling modules are expensive, mainly due to the fact that they are being made in molded layers specifically-designed as indirect cooling modules. Therefore, what is needed is a source of material for indirect cooling modules that is in common supply and is inexpensive relative to the cost of specifically-molded indirect cooling modules.

A second drawback to conventional indirect evaporative cooling has been efficiency. Conventionally-manufactured indirect cooling modules are inefficient, mainly due to the fact that effective evaporative cooling takes place only in the top half of the conventional modules. There are two main reasons for this: poor water distribution and poor air distribution across the inlet face. In addition, inefficiency results from the dry air side not having sufficient heat transfer surface area above the cool, saturated air side.

The water distribution problem occurs due to the construction of the conventional modules. In the prior art, cooling air is passed vertically upward while water is discharged, from a header at the top of the module, downward against the up-flow of the cooling air. In doing this, some of the water evaporates, thereby cooling the air flowing upward while the unevaporated water drops to a reservoir below to be pumped back to the top. In conventional cooling modules, effective evaporative cooling takes place only at the upper half of the module, thereby limiting the cooling efficiency.

The air distribution problem arises in trying to get the air passing through adjacent chambers within the module to have the proper turbulence, also known as minimizing the boundary layer and maximizing residence time. Even distribution of air across the face of the module is the key to gaining proper turbulence, yet none of the currently-used modules have been able to properly solve this problem. Therefore, what is needed is an indirect cooling module which ensures even distribution of air across the face of the module, and therefore achieves the maximum heat transfer while providing the least amount of pressure drop and air contact velocity.

An example of one indirect evaporative cooler is shown in U.S. Pat. No. 5,664,433 (Bourne et al.) which discloses an "indirect and direct evaporative cooling system." The Bourne et al. cooler uses specifically-designed heat exchange plates and a double cooling system where the air is first cooled through indirect cooling and then further cooled using direct cooling. The Bourne et al. device uses an indirect heat exchanger manufactured by the Adobe Corporation of Phoenix, Ariz. under two U.S. Patents (U.S. Pat. Nos. 4,566,290 and 4,461,733). These patents ('290 and '733) disclose a thin-wall formed and molded plate system, with an added felt coating on the evaporatively cooled air side. The Bourne et al. indirect heat exchanger has an efficiency rating of less than 40%, thus relying on the direct cooling stage to create a majority of the cooling effect.

Another patent, U.S. Pat. No. 4,512,392 (van Ee et al.), discloses a heat exchange apparatus using a heat exchanger core formed from polypropylene extruded sheets. The van Ee device differs from the present invention in a number of ways, and lacks many of the efficiency-increasing features of the present invention. The van Ee patent discloses an air-to-air heat recovery system, rather than an air cooling system using evaporatively-cooled air to refrigerate incoming air. The van Ee device uses short spacers to separate opposing sheets, but gives them no other function. The van Ee patent precludes the use of the heat exchanger coupled with additional cooling means, while the present invention may include a direct evaporative cooling module, vapor-compression coils and multi-staged indirects. Finally, the van Ee patent is designed primarily for livestock with controls set for air flushing of mold, bacteria, etc, while the present invention is primarily designed for human comfort.

What is still needed, therefore, is an indirect evaporative cooling apparatus that is inexpensive and is more efficient than conventional indirect evaporative cooling modules, due to improvement of water and air distribution within the apparatus.

SUMMARY OF THE INVENTION

The present invention is an indirect evaporative cooling module that accomplishes heat exchange between fluids in its adjacent primary and secondary passages. More specifically, the invented cooling module features counter-current contact of a liquid and a secondary fluid to evaporatively cool the secondary fluid. The module also features a flow of primary fluid, substantially isolated from the liquid and the secondary fluid, in passages that are separate from, but adjacent to, the secondary fluid passages. Heat exchange takes place between the secondary fluid and the primary fluid, and is preferably optimized by a number of efficiency-increasing features, mainly focusing on improving flow distribution in the module, increasing turbulence of the cooled air down to the molecular boundary layer, and improving contact between liquid and fluid in the secondary passages. These features may include: 1) roughening of the surfaces of the secondary fluid passages to increase surface area of the secondary air passages and improve heat transfer; 2) down-comer channels that isolate some liquid from the secondary fluid to direct that portion of liquid to the bottom of the heat exchange module for splashing or other mixing with the incoming secondary fluid; and/or 3) a pre-cooling chamber for increased liquid-secondary fluid contact located up-stream of the secondary passages, in the secondary fluid stream at or near the secondary fluid inlet. Thus, the invented cooling module maximizes heat exchange in a given module size by using substantially all of the available surface area for heat exchange rather than approximately the top half.

Also, the efficiency-increasing features may include turning vanes, convergers, or other flow management members at the fluid inlets and/or at the fluid outlets. For example, turning vanes may be positioned near the primary fluid inlet of the heat exchanger for directing the primary fluid into the primary passages with a more even flow distribution. Convergers may be positioned at the bottom of the heat exchanger near the secondary fluid inlet to direct the secondary fluid into the secondary passages with a more even flow distribution.

Additional improvement of fluid-liquid contact in the invented cooling module is done by improved management of the water used in the cooling process, and by a high surface area evaporative pad or a mesh for retention of the water in the secondary passages. The preferred water distributor at the top of the heat exchanger module efficiently and evenly directs water into all of the secondary passages and all of the down-comers, without plugging, to provide moisture consistently on substantially the entire secondary surface. The water distributor creates an efficient top evaporative cooling zone, while the down-comer system described above creates an effective lower evaporative cooling zone, both top and bottom zones substantially inside the passages of the module. The mesh is preferably positioned inside each secondary passages from the top of the passages to the bottom of the passages, to distribute and retain water both from the distributor and from the down-comers for contact with and evaporation into the up-flowing air.

To create yet another cooling zone, mesh or other high surface area pad preferably is also positioned to hang outside of, and just below, the inlet of the secondary passages. This creates a pre-cooling chamber directly below the cooling module corrugated sheets, inside the module housing, which gives the system a "head-start" in cooling the secondary air.

The invented heat exchanger cooling module preferably cooperates with, on the inlet side, a primary air source, a secondary air source, and a water source. On the outlet side, the heat exchanger cooperates with a water recovery and/or recirculation system, a cooled primary air outlet system for distributing cooled air to the space being air-conditioned, and a secondary air outlet system for handling the wet air exiting the heat exchanger. These inlet and outlet systems may be of conventional construction and operation.

The indirect cooling module preferably is made from extruded, twin-walled, corrugated, fluted plastic sheeting. This sheeting is an inexpensive, commercially available material, which greatly reduces the cost of such a cooling module. Sheets of this corrugated material are cut into plates and strips which are preferably laminated together to form the primary and secondary passages of the heat exchanger core. These passages can be configured any number of ways, ranging in position from vertical to horizontal to diagonal.

The internal passages formed by the corrugations inside each sheet become the primary air passages, while space between adjacent sheets of the corrugated material become the secondary passages. Typically, such corrugated sheets include a fluted or rippled patten on their exterior surfaces, which are formed when the internal corrugations are formed. These flutes aid in creating turbulence in the secondary passages and therefore aid the secondary air to "scrub" heat from the fluted passage walls. The flow through the primary passages and secondary passages may be cross-flow, counter-flow and even baffle-flow, relative to each other, as long as consideration is made for proper design of the piping in the inlet and outlet systems to maintain the primary and secondary streams separate. The corrugated plates are preferably cut into rectangular, trapezoidal or rhombus configurations, to form a core adapted to the size and shape of the cooler in which the core is installed, and adapted to the inlet and outlet piping of the particular cooler.

Preferably, the strips that are laminated between sheets of the corrugated material are positioned to extend substantially all the way from the top area of the corrugated sheets to the bottom area of the corrugated sheets, with their internal passages run generally vertically. This way the strips may serve a dual purpose: 1) to separate opposing sheets to create the space between sheets that becomes the secondary passages, and 2) to have an interior channel(s) that channel (s) water from the water distribution system to near the bottom of the sheets, particularly to near the inlet of the secondary passages, to contact the incoming secondary air near the bottom of the passages and, preferably to wet the mesh in the pre-cooling chamber. Thus, by using an inexpensive preformed material, one may cut and install down-comer "tubes" that also form an important sheet spacing function. The spacer strips are preferably cut to include more than one channel, and preferably installed in at least two positions along the width of the sheets, near each edge of the sheets. Alternatively, other tubes may be used as down-comers rather than the corrugated strips. For example, extruded members that have one or more cavities per member may be used, as long as the cavity is adapted for conveying the liquid through the tube.

DESCRIPTION OF THE PREFERRED EMBODIMENTS

Figure 1:
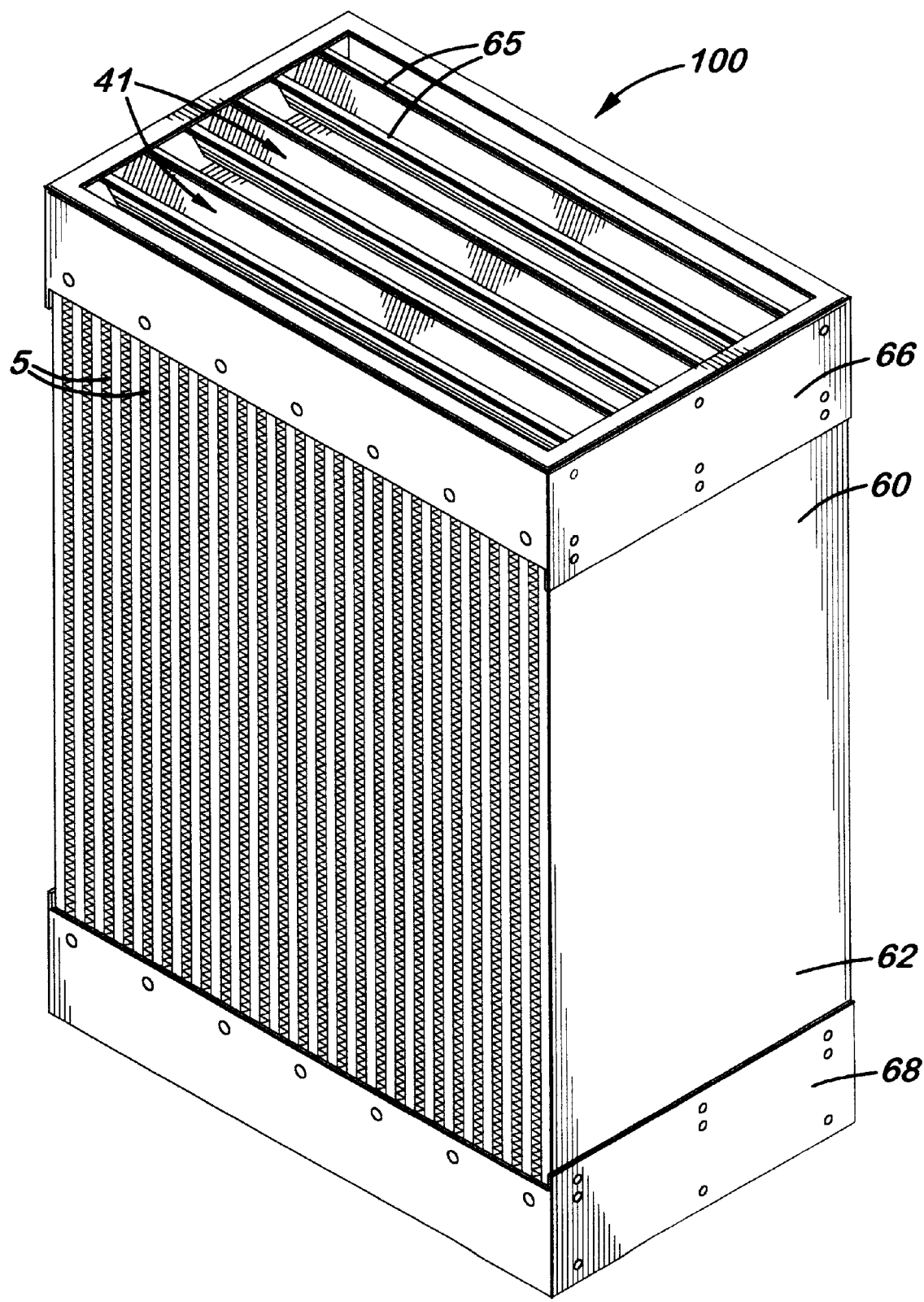
FIG. 1 is a perspective view of one embodiment of the invented heat exchange module.

While the general term "air" is used throughout this application, the inventors also envision the use of any fluid, including gases and liquids. The present heat exchanger can process air to air, liquid to liquid, and/or air to liquid.

The present invention is an indirect evaporative cooling module, preferably comprising a heat exchanger, a primary air source, a secondary air source, primary air passages, secondary air passages, a water source, spacers to also act as down-comers, a water distribution system, a pre-cooling chamber, and mesh sheeting or a pad for water retention. The preferred heat exchange module 100 is illustrated, removed from housing and inlet and outlet piping and ducting, in FIG. 1.

Preferably, the heat exchange module 100 comprises plates 5 and strips 15 of a commercially available twin-wall (105, 105'), corrugated (115), fluted, plastic sheeting material. One such type of material is known by the registered trademark Coroplast™, a commercially available polypropylene extrusion comprising two parallel sheets 105, 105' separated by a plurality of parallel spacer strips 115 running along the length of the sheets. In Europe, and perhaps in other countries, this material is referred to as "cartonplast." Other commercially available, twin-walled extruded sheets have "V" or diagonal shaped corrugation that will equally work in this description.

As shown in the Figures, plates 5 of the sheeting material are separated by strips 15 of this sheeting and are affixed together and then stacked to create primary air or "space air" passages 10 and secondary air or "cooling air" passages 50. The plates 5 and the strips 15 may be made of differing grades of such sheeting material, for instance the plates 5 being thicker than the strips 15. The laminated plates 5 and strips 15 are referred to as the heat exchange core. The plates 5 are preferably cut into rectangular, trapezoidal or rhombus configurations, such shape dependant upon the size and shape of the cooler in which the core is installed. The plates in the preferred embodiment are preferably rectangular with their internal corrugations and external flutes orientated to run generally horizontally, but other shapes and orientations are possible. The strips 15 are preferably twin-walled flutes formed from the sheeting material and can be configured to run vertically, horizontally, or diagonally. The strips 15 preferably run vertically all the way from the top of the plates 5 to the bottom of the plates 5, and have generally vertical corrugations or channels running all the way from the top to the bottom of the strips, so that the strips are also "down-comers" or "down-comer tubes" 15.

The secondary air passages 50 are defined as the space between adjacent sheets and between strips 15. The primary air passages 10 are defined as the interior spaces of one of the corrugated sheets. Efficiency of the present invention 100 is greater due to the surface area within the primary 10 and secondary 50 air passages. Due to their structures, the primary air passages 10 have 60% more internal surface area than the secondary air passages 50, which results in a greater heat transfer out of the primary air 25 and into the secondary air 30.

The plates 5 can be oriented in relation to the strips 15 so that the primary air passages 10 run either vertical, horizontal or diagonal in relation to the secondary air passages 50. The fluid movement within the passages may be configured for cross-flow, counter-flow, or baffle-flow movement.

The primary passages 10 are for carrying a fluid 25, such as air, while the secondary passages 50 are also for carrying a fluid 30, such as air. The preferred embodiment uses a combination of air and water in the secondary fluid passages 50 and solely air within the primary fluid passages 10, all the air preferably originating outdoors. Alternatively, other air sources may be used, for example, exhaust air from a building may be used as all or a portion of the secondary air.

The fluids 25, 30 are moved through the heat exchange core through use of a blower, a pump or other methods. A singular blower could be used in conjunction with a splitter for splitting the discharge to flow into both the secondary and primary fluid passages 10, 50. The use of more than one blower, pump or other method of moving a fluid are envisioned as well by the inventors. As such, one blower could be used to move air though the secondary passage, and one blower could be used to move air through the primary passage. Also, the blowers, pumps or other apparatus for moving a fluid may either push the fluid or pull the fluid through the passages.

Figure 2:
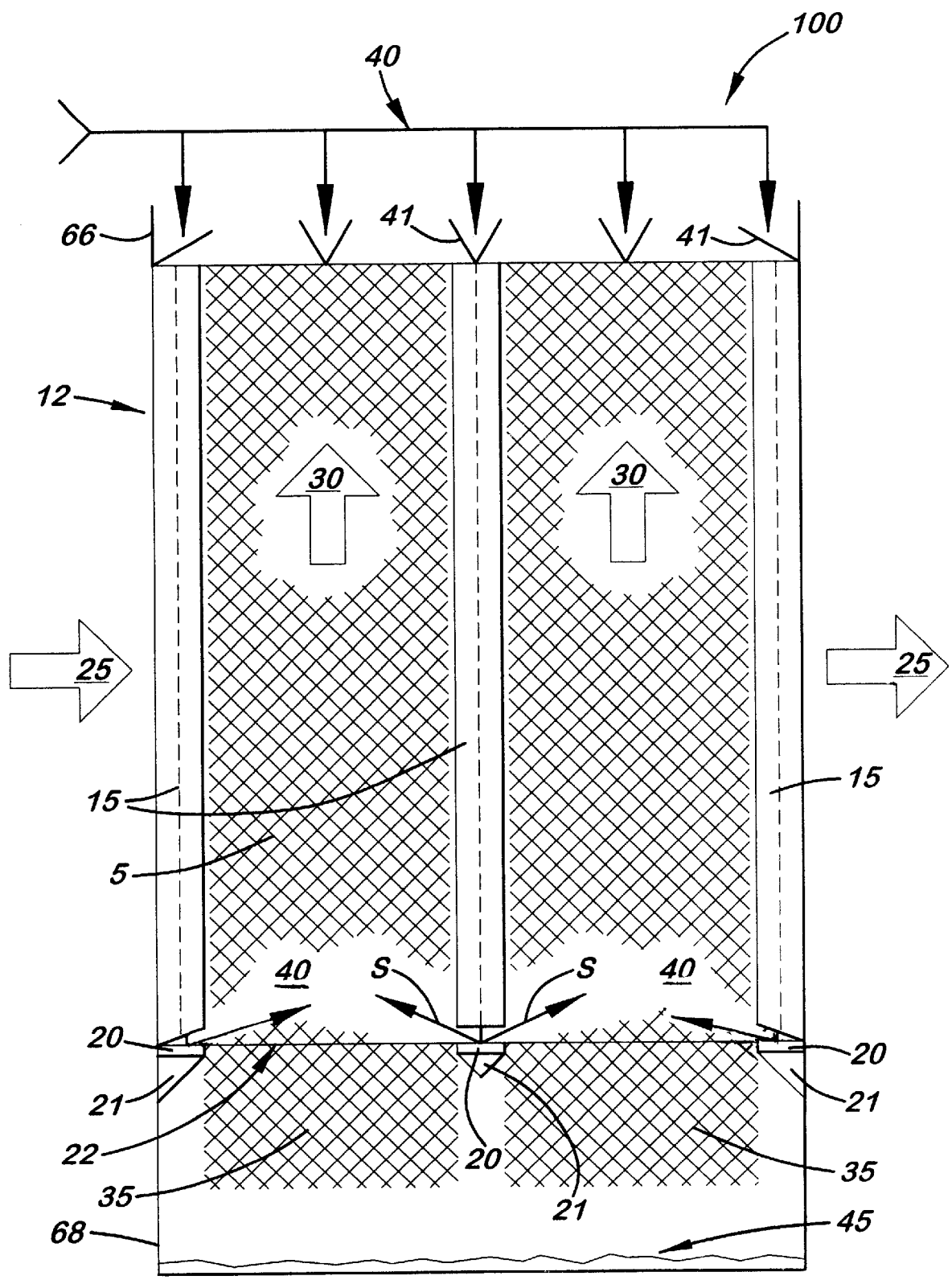
FIG. 2 is a cross-sectional side schematic view of the embodiment of FIG. 1, having mesh installed inside the exposed secondary air passage.
Figure 3:
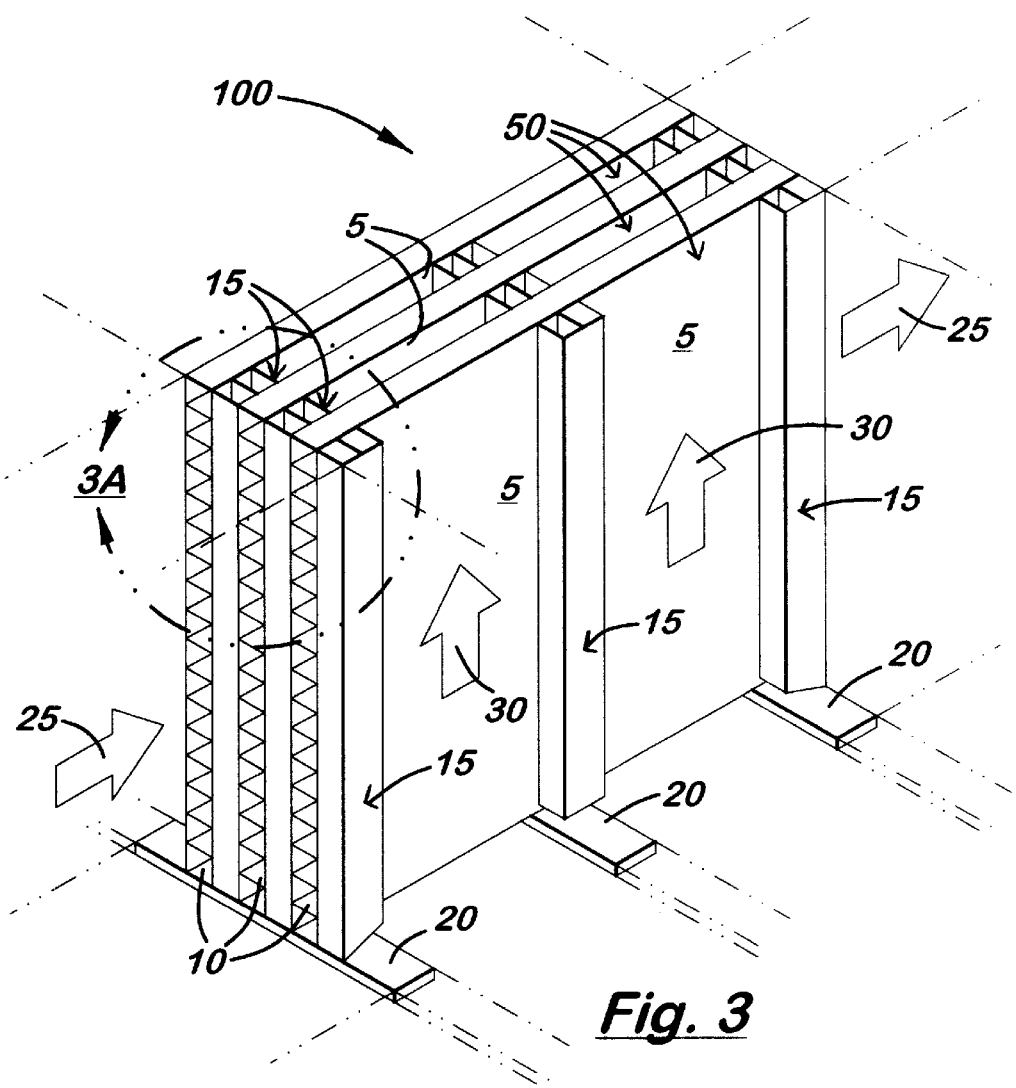
FIG. 3 is a perspective view of a portion of the apparatus shown in FIG. 1, illustrating the plate and spacer construction of the module.
Figure 3A:
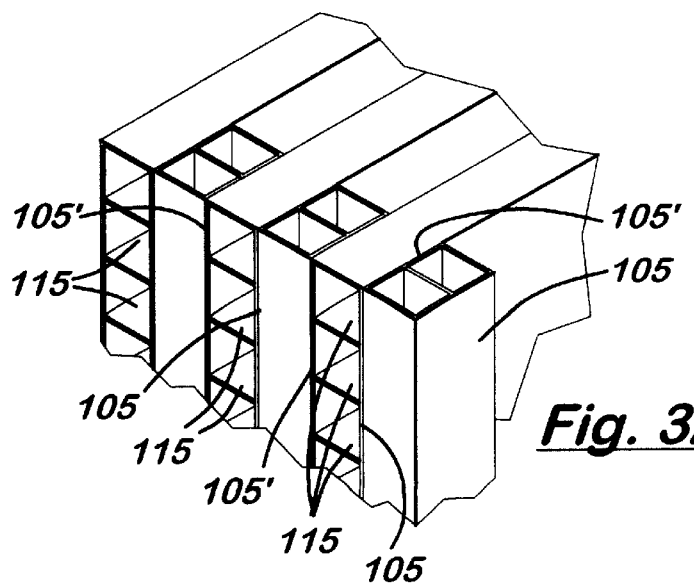
FIG. 3A is a partial detail view of an area circled as "3A" in FIG. 3, which shows twin-walled, corrugated sheets.
Figure 4:
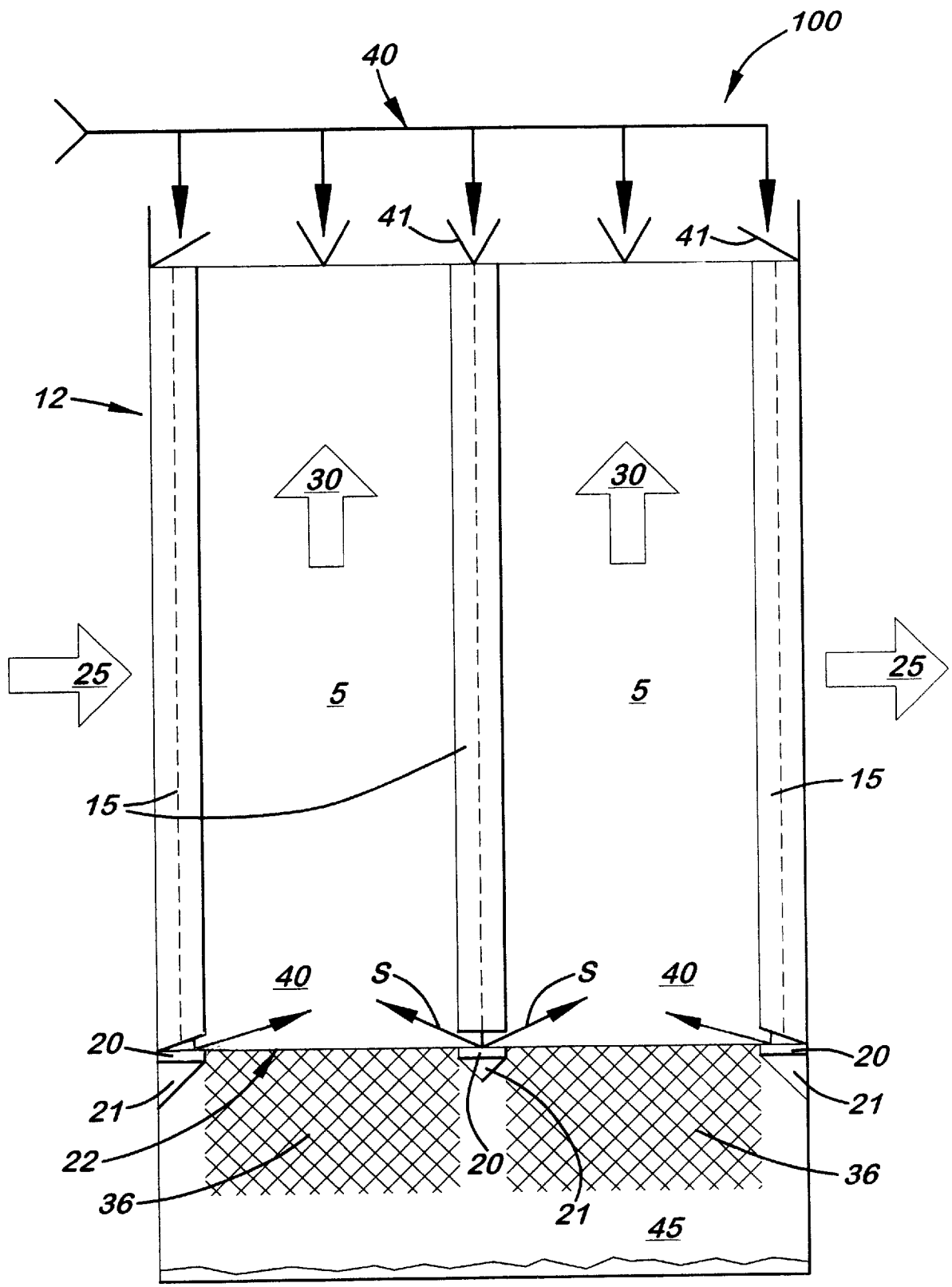
FIG. 4 is a cross-sectional side schematic view of an embodiment of the invented heat exchange module, having a water retention pad installed in the space above the water reservoir at the bottom of the module.

FIGS. 2–4 show an embodiment for a cross-flow arrangement. In these Figures, the plates 5 are arranged so that the primary passages 10 are in a generally horizontal position. The strips 15 are arranged so that the secondary passages 50 are in a generally vertical position. Thus, the flow within the primary passages 25 runs perpendicular to the flow within the secondary passages 30.

Figure 5:
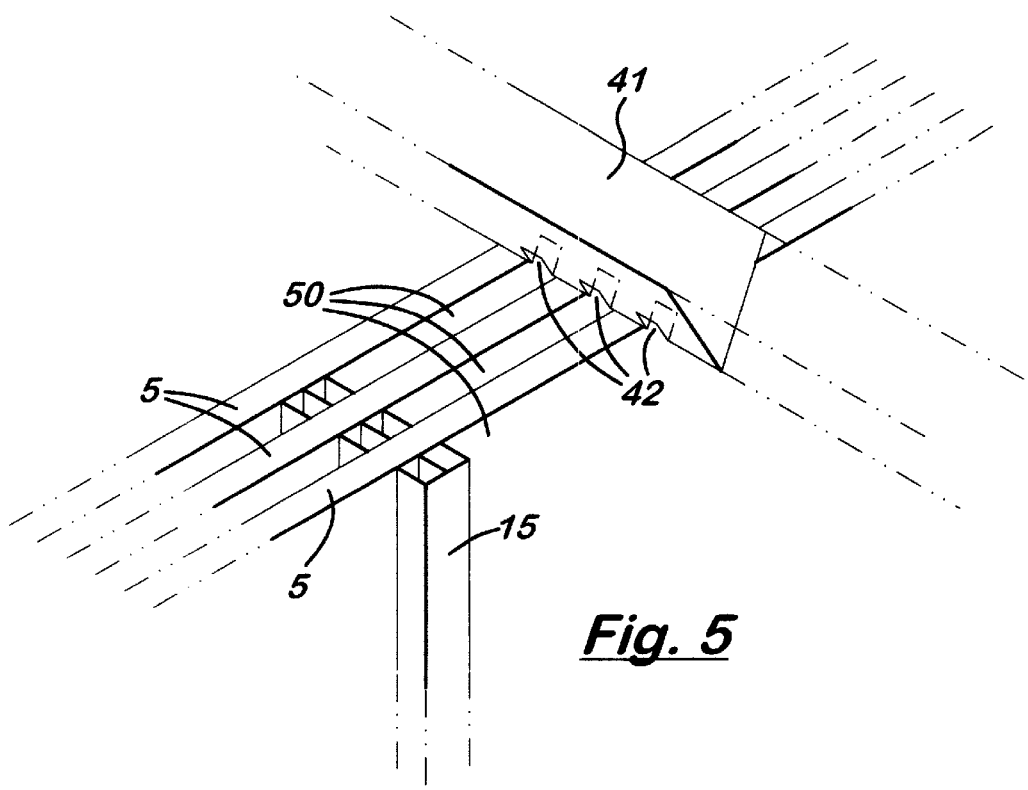
FIG. 5 is a partial perspective view of one embodiment of a V-shaped trough of a water distribution system of the invented heat exchange module, having a plurality of small V-shaped slots positioned transverse to the plates of the module.

Preferably, in the present invention, water flows or is sprayed into V-shaped troughs 41 with slots 42 spaced to match the top openings of the secondary air passages 50, as shown in FIG. 5, so that water flows down into each secondary passage at several locations along the top of each secondary passage. Preferably, troughs 41 are also aligned with the down-comers, that is, positioned over the strips 15, so that water also flows down the down-comers and strikes bottom plates 20 or other members for splashing or mixing the down-comer water with the incoming secondary air. These bottom plates 20 splash the water back upwards, onto the mesh screen 35 extending down through the bottom zone of the secondary passages, as shown by the arrows labeled "S" in FIG. 2. Alternatively, in embodiments not having mesh 35 in the secondary passages but having a pad 36 extending down from the secondary passages, the down-comer water may splash into the secondary passages to contact the up-flow of air and may also splash onto or falls onto the pad 36. In any of these scenarios, the down-comer system provides an improved water source near the bottom zone of the cooling module, thereby pre-cooling the air 30 before it enters the secondary passages 50, and more efficiently cooling the air in the bottom zone of the module. Unevaporated water, either water that has originated from the water distributor at the top of the plates or water that has originated from the down-comers, drops into a reservoir 45 for distribution back to the top 40.

Alternatively, water may be distributed in other ways at the top of the module, for example, a well-designed spray system that evenly distributes water to all of the secondary passages along substantially their entire surfaces. Alternatively, water from a water source may be sprayed directly into the bottom zone of the module, in place of or in addition to the down-comer system. This, however, requires more complex internal and external piping, and is therefore less economical and less easily maintained than the simple down-comer system.

Figure 6:
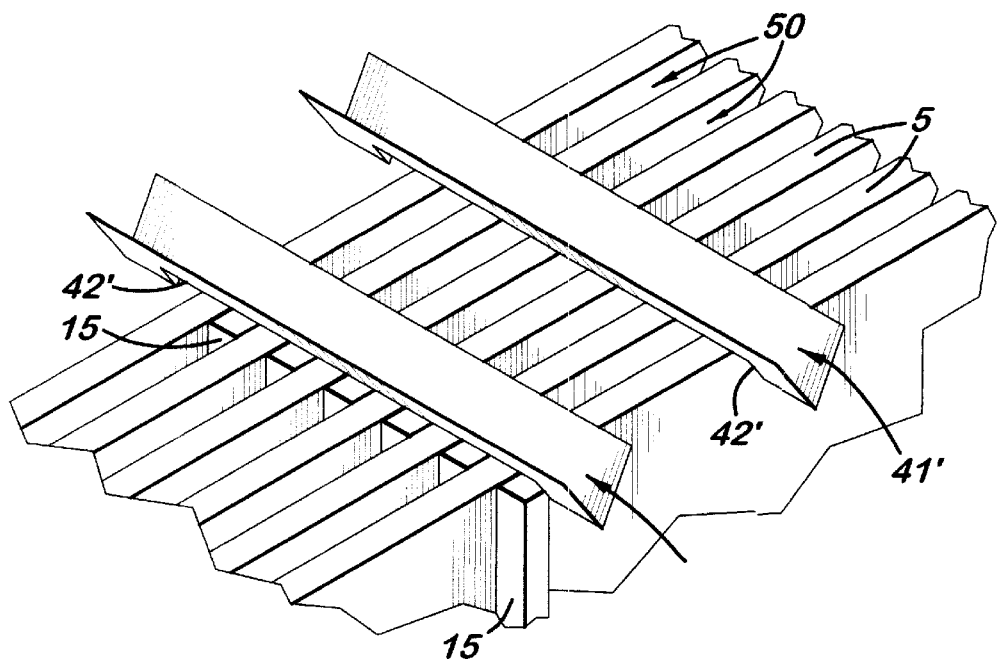
FIG. 6 is a partial perspective view of another embodiment of troughs for water distribution, wherein the troughs each have one elongated slot.

An alternative trough design is shown in FIG. 6, in which each trough 41' preferably has a single elongated slot 42', instead of a plurality of small slots 42 in each trough 41. This design tends to distribute the water in a thin film across each passageway. This design may be used to improve distribution and to further prevent plugging, for example, in installations where water quality is less than optimum.

The preferred embodiment uses a mesh 35 which serves to pre-cool the secondary air 30 through an evaporative cooling process as the air 30 entering into the secondary air passages 50 passes through the mesh 35, which is moistened with a fluid, such as water.

Mesh 35 may extend through the secondary passages 50, substantially from the top to the bottom of the secondary passages, and, as shown in FIG. 2, optionally may extend down into the space above the reservoir 45. By placing the mesh 35 in the passages 50, water 40 flowing downwards through the secondary passages 50 and air 30 passing upwards through the secondary passages 50 encounter a greater surface area within the secondary passages 50 and a greater degree of inner-passage turbulence. These combine to greatly increase the efficiency of heat transfer into the passage 50.

As represented in FIG. 4, a high surface area pad 36 may be positioned at various locations across the face 22 of the secondary air flow to retain water in contact with the air 30 entering into the air passages 50. Retaining water in this space above the reservoir creates a pre-cooling chamber for air 30 prior to entering the secondary air passages 50. The pad 36 may be installed whether or not mesh or a pad is used inside the secondary passages and may be the same or different material as the material installed inside the secondary passages.

The present invention 100 is preferably used by mounting within the heating and cooling system of the building to be cooled. Then, a source of outside air (with a hypothetical 72 degree wet bulb measurement and a 101 degree dry bulb measurement) is used to supply air entering into the secondary 50 and the primary air passages 10. Air 30 within the secondary air passages 50 is then cooled through evaporative cooling by dropping water through the top of the secondary air passages 50 and forcing air upwards through the secondary air passages 50. Air 30 leaving the secondary air passages 50 would hypothetically have a 72 degree wet bulb measurement and a 72 degree dry bulb measurement, a difference of 29 degrees from the original outside air. This results in air which is cooler and saturated at 100% humidity. This wet, cooled air 30 is then used to cool the primary passageways 10 containing the primary air 25, thereby resulting in the transfer of heat out of the primary air 25 within the primary passages 10 and into the air 30 and water 40 located within the secondary air passages. This primary air 25, after it is cooled, hypothetically having a near 72 degree dry bulb and a 63 degree wet bulb measurement, is then transferred into the building to be cooled, thereby resulting in the overall cooling of the space air in the building. Conventionally-manufactured, comparably-sized indirect evaporative cooling technology results in efficiencies averaging around 40%. It is possible to achieve a 80% efficiency with conventional technology, however, an extremely large and typically infeasible (for reasons including cost and size) heat exchanger is needed. The present invention has an anticipated efficiency in heat transfer of at least 60%.

The inventors also envision the use of material to create top and bottom chambers on the heat exchange module. As illustrated in FIG. 1, a top chamber 66 may be formed from sheet metal and connected to the top region 60 of the plates 5 for mounting the water distribution means and for reducing the splashing of water and channeling the water into the invention 100. A bottom chamber 68 may be formed from sheet metal for trapping and connected to the bottom region 62 of the plates 5, for holding water in the reservoir 45, reducing water spray out from the module, and forming an interior space above the reservoir 45 for the mesh 35 or pad 36, to form the pre-cooling chamber.

Other means for increasing efficiency of the invented heat exchanger are envisioned. For example, in confined inlet space applications, turning vanes (not shown) may be installed at the primary air inlet 12 of the heat exchanger to effect even air flow across the face 12 of the heat exchanger and into the primary passages 10. These turning vanes can be conventional vanes used in the heating and cooling trade, and serve to deflect air into the primary passages 10. Even air flow results in a more consistent fluid pressure level from passage to passage 10, thereby allowing for greater efficiency and consistency in the exchange of heat.

Another means of improving efficiency may be to add convergers 21 at the bottom of the secondary passages 50 of the heat exchanger 100 to reduce secondary air inlet turbulence. The convergers serve to deflect and channel air directly into the secondary passages 50, thereby reducing turbulence. Reducing such turbulence results less pressure drop in the secondary air passages.

Another way to fine-tune efficiency may be to provide a shape to the water distribution means that creates a venturi effect at the top of the heat exchanger at the secondary air discharge. This may be done, for example, by use of the V-shaped troughs, or V-shaped troughs with lips 65 that extend out into the secondary air stream, as illustrated by the troughs in FIG. 1.

Preferably, the walls of the extruded, twin-walled, corrugated plastic sheet stock is thin. Thinner material provides less resistance to heat exchange and more space within a given volume for heat exchange contact, thus, making the present invention 100 even more efficient.

Preferably, the "exterior" wall surfaces of each sheet, those defining and lining the secondary passages 50, is roughened to increase the surface area of the passageway surfaces and thereby retain moisture and increase heat transfer. Such roughening preferably is done physically, such as through the use of a sander or other grit-bearing or abrasive material on the wall surface. Alternatively, the roughening can be a result of the application of another substance, such as a rough finish sprayed or spread upon the surfaces. The preferred roughening of the secondary surfaces allows the secondary surface to "grab" moisture from the air and/or the falling water, while the secondary air turbulence "scrubs" heat from the secondary surface to cool the surface and, hence, the primary air.

The inventors also envision the use of rapid heat transfer media, such as mesh of aluminum screening, in each secondary air passageway to increase heat transfer into primary air passageway. As discussed above, sheet or pad material for water retention is also a preferred feature for the space between the corrugated sheets and the reservoir.

Although this invention has been described above with reference to particular means, materials and embodiments, it is to be understood that the invention is not limited to these disclosed particulars, but extends instead to all equivalents within the scope of the following claims.

We claim:

1. An indirect evaporative cooling heat exchanger for cooling of air, the heat exchanger comprising:
a plurality of sheets of plastic material, each sheet having two parallel, generally vertical, spaced outer wall surfaces, and having a top wall, a bottom wall, a first side edge, a second side edge, and a plurality of passageways between the two outer wall surfaces extending through the sheets from said first side edge to said second side edge, the passageways receiving primary air at the first side edge from a primary air source and conveying the primary air to the second side edge, wherein:
the plurality of sheets are parallel to each other and spaced from each other to form a plurality of generally vertical secondary passages between the outer wall surfaces of the plurality of sheets, each secondary passage having a top area and a bottom area, wherein the secondary passages receive cooling air from a cooling air source and convey the cooling air from said bottom areas to said top areas;
a down-comer tube received in one of said secondary passages and extending substantially all the way through the secondary passage from the top area to the bottom area of the secondary passage, the down-comer tube having an interior space open at a top end near said top area and open at a bottom end near said bottom area; and
a water distributor system located above the plurality of sheets and having a water outlet flowing water into a plurality of the vertical secondary passages and a water outlet flowing water into said tube;
wherein water falls downward through said secondary passages countercurrent to and contacting the upward-flowing cooling air to evaporatively cool the cooling air;
wherein water falls downward through the tube to enter the bottom area of the cooling air passage to contact the cooling air; and
wherein heat from the primary air in said passageways transfers through the outer wall surfaces of said plurality of sheets into the evaporatively cooled cooling air in the secondary passages.

2. A heat exchanger as in claim 1 comprising a plurality of down-comer tubes located in each of said secondary passages.

3. A heat exchanger as in claim 2 comprising a splash plate located generally below and spaced from the open bottom end of each of said tubes, against which splash plate the water falling down through each tube impacts and splashes into the bottom area of its respective secondary passage.

4. A heat exchanger as in claim 1 comprising mesh material received in said secondary passages for increasing surface area in the secondary passages for contact between water and cooling air.

5. A heat exchanger as in claim 1 comprising:
a reservoir below the plurality of sheets for holding water that falls down into the reservoir from the secondary passages; and,
mesh extending down out of the secondary passages into a space above the reservoir for being wet by the falling water and contacting the cooling air.

6. A heat exchanger as in claim 1 wherein said outer wall surfaces are roughened surfaces.

7. A heat exchanger as in claim 1 comprising a splash plate located generally below and spaced from the open bottom end of said tube against which the water falling down through the tube impacts and splashes into the bottom area of the secondary passage.

8. A heat exchanger as in claim 1 wherein the water distribution system comprises a plurality of conduits transverse to the plurality of sheets and each conduit having a water outlet slot for directing water into said secondary passages or said tube.

9. A heat exchanger as in claim 8 wherein said conduits are V-shaped troughs having a pointed bottom wall and at least one slot in the pointed bottom wall, which slot is the water outlet.

10. A heat exchanger as in claim 1 wherein each of the plurality of sheets is a plate of twin-walled corrugated plastic.

11. A heat exchanger as in claim 1, wherein said down-comer tube is made of twin-walled corrugated plastic material.

12. An indirect evaporative cooling heat exchanger, the heat exchanger comprising:
a housing comprising a primary fluid inlet, a primary fluid outlet, a secondary fluid inlet, a secondary fluid outlet; and,
a heat exchange module received inside the housing, the module comprising:
a plurality of sheets, each sheet having exterior front and back walls, exterior top and bottom walls, first and second side walls, interior passageways extending through the sheet from the first side wall to the second side wall and having open ends at the first side wall in fluid communication with the primary fluid inlet and having open ends at the second side wall in fluid communication with the primary fluid outlet;
wherein the sheets are generally parallel and have spaces between them, wherein each of said spaces is a secondary passage having a bottom opening in fluid communication with the secondary fluid inlet and a top opening in fluid communication with the secondary fluid outlet;
a liquid distribution system for delivering liquid to the top openings of the secondary passages so that the liquid falls down through the secondary passages and contacts secondary fluid flowing up through the secondary passages; and
a reservoir positioned beneath the plurality of sheets and in fluid communication with the secondary fluid inlet and the secondary passages, the reservoir catching the liquid that falls down from the secondary passages;
wherein the heat exchange module further comprises a tube extending generally vertically through one of the secondary passages, the tube having a hollow interior opening at a top end near the top opening of the secondary passage and opening at a bottom end near the bottom opening of the secondary passage, wherein the liquid distribution system has a liquid outlet positioned above the tube top end so that liquid flows down the tube to enter the secondary passage near said bottom opening.

13. An indirect evaporative cooling heat exchanger as in claim 12, wherein the heat exchange module further comprises a splash plate located near the bottom end of the tube for directing liquid flowing down the tube to splash into the secondary passage near the bottom opening of the secondary passage.

14. An indirect evaporative cooling heat exchanger as in claim 12, further comprising a plurality of tubes, one tube extending generally vertically through each of the secondary passages, each tube having a hollow interior opening at a top end near the top opening of the secondary passage and opening at a bottom end near the bottom opening of the secondary passage, and wherein the liquid distribution system has a liquid outlet positioned above each tube top end so that liquid flows down each tube to enter their respective secondary passages near said bottom openings.

15. A heat exchanger as in claim 14 wherein the liquid distribution system comprises a plurality of troughs, some of said troughs having a bottom wall having a slot above each secondary passage, and some of said troughs having a bottom wall having a slot above each of said tubes.

16. A heat exchanger as in claim 12 comprising mesh material received in said secondary passages for increasing surface area in the secondary passages for contact between liquid and secondary fluid.

17. A heat exchanger as in claim 12 wherein said exterior front and back walls of the sheets are rough surfaces.

18. A heat exchanger as in claim 12 wherein each of the plurality of sheets is a plate of twin-walled corrugated plastic.

19. A heat exchanger as in claim 12 wherein the liquid distribution system comprises a plurality of troughs, each with a bottom wall having a plurality of slots, one slot above each secondary passage.

20. A heat exchanger as in claim 12 wherein the liquid distribution system comprises a plurality of elongated troughs, each with a bottom wall having an elongated slot extending transverse to the plurality of sheets.

21. A heat exchanger as in claim 12, wherein said tube is made of twin-walled corrugated plastic material.

22. A method of indirectly cooling a fluid, comprising:

providing a plurality of primary fluid passages and a plurality of secondary fluid passages adjacent to each other;

flowing primary fluid through the primary fluid passages;

supplying secondary fluid into the secondary fluid passages at a secondary fluid inlet to flow to a secondary fluid outlet;

supplying a liquid into the secondary passages near the secondary fluid outlet so that the liquid flows counter-current to the secondary fluid to evaporatively cool the secondary fluid;

providing a plurality of down-comers in the secondary passages and flowing liquid through the down-comers to the secondary fluid inlet to contact the secondary fluid;

wherein heat from the primary fluid transfers from the primary fluid passages into the secondary fluid passages to heat the secondary fluid.

23. A method of indirectly cooling a fluid as in claim 22, further comprising providing mesh at the secondary fluid inlet and splashing liquid from the down-comers onto the mesh and causing the secondary fluid to contact the mesh.

24. A method of indirectly cooling a fluid as in claim 22, further comprising roughening walls of the secondary passages.

25. A method of indirectly cooling a fluid as in claim 24, wherein said roughening is done by use of an abrasive material on the walls of the secondary passages.

26. A method of indirectly cooling a fluid as in claim 25, wherein said roughening is done by sanding the walls of the secondary passages.

27. A method of indirectly cooling a fluid as in claim 24, wherein roughening is done by applying a rough-finish substance onto the walls of the secondary passages.

* * * * *